United States Patent [19]
Dorfman et al.

[11] 4,013,815
[45] Mar. 22, 1977

[54] FIRE RETARDANT UNSATURATED POLYESTERS

[75] Inventors: Edwin Dorfman; Willis T. Schwartz, Jr., both of Grand Island; Raymond R. Hindersinn, Lewiston, all of N.Y.

[73] Assignee: Hooker Chemicals & Plastics Corporation, Niagara Falls, N.Y.

[22] Filed: Dec. 18, 1975

[21] Appl. No.: 642,026

Related U.S. Application Data

[63] Continuation-in-part of Ser. No. 383,749, July 30, 1973, abandoned.

[52] U.S. Cl. .......................... 428/285; 260/40 R; 260/863; 260/DIG. 24; 428/921
[51] Int. Cl.² ........................................ C08L 67/06
[58] Field of Search .......... 260/863, 45.75 R, 75 H, 260/40 R; 428/285

[56] References Cited

UNITED STATES PATENTS

| | | | |
|---|---|---|---|
| 2,467,526 | 4/1949 | Harris | 260/863 |
| 2,610,920 | 9/1952 | Hopkinson | 260/22 |
| 2,871,215 | 1/1959 | Hyland | 260/40 |
| 2,931,784 | 4/1960 | Raymond | 260/863 |
| 3,124,550 | 3/1964 | Salgado et al. | 260/22 |
| 3,274,293 | 9/1966 | Elfers et al. | 260/869 |
| 3,324,158 | 6/1967 | Cyba et al. | 260/439 |
| 3,326,832 | 6/1967 | Rauschenbach et al. | 260/28.5 |
| 3,340,226 | 9/1967 | Stivers | 260/45.75 |
| 3,396,133 | 8/1968 | Forman et al. | 260/28.5 |
| 3,418,267 | 12/1968 | Busse | 260/33.8 |
| 3,475,372 | 10/1969 | Gable | 260/45.75 |
| 3,595,815 | 7/1971 | Willersinn et al. | 260/2.5 |
| 3,669,923 | 6/1972 | Lintz | 260/41 C |
| 3,697,456 | 10/1972 | Pitts et al. | 260/2.5 AJ |
| 3,721,634 | 3/1973 | Versnel | 260/2.5 FP |
| 3,753,927 | 8/1973 | Kracklauer | 252/428 |
| 3,821,151 | 6/1974 | Mitchell | 260/31.8 R |
| 3,825,520 | 7/1974 | Parts et al. | 260/45.75 R |

FOREIGN PATENTS OR APPLICATIONS

| | | |
|---|---|---|
| 621,125 | 6/1963 | Belgium |
| 643,139 | 7/1964 | Belgium |
| 1,387,400 | 12/1964 | France |
| 1,387,400 | 5/1966 | France |
| 1,411,368 | 8/1965 | France |
| 2,012,475 | 3/1970 | France |
| 1,176,852 | 8/1964 | Germany |
| 1,282,934 | 11/1968 | Germany |
| 1,282,937 | 7/1969 | Germany |
| 1,282,938 | 8/1969 | Germany |
| 2,120,490 | 4/1971 | Germany |
| 792,016 | 3/1958 | United Kingdom |
| 772,773 | 4/1957 | United Kingdom |
| 1,003,327 | 9/1965 | United Kingdom |

OTHER PUBLICATIONS

Pitts, "Antimony–Halogen Synergistic Reactions", J. Fire and Flammability, 1972, 51–84.
Unexamined German Patent Application No. 2,127,613, opened for inspection 12/1971, Kelly (translation).

*Primary Examiner*—Donald E. Czaja
*Assistant Examiner*—E. A. Nielsen
*Attorney, Agent, or Firm*—Peter F. Casella; James F. Mudd; David A. Stein

[57] ABSTRACT

Highly fire retardant unsaturated polyester resins which exhibit low burning rates, low smoke generation and beneficial char formation in the presence of a flame are provided by incorporating up to about 5 weight percent of iron or an iron compound in a halogen containing unsaturated polyester of a polycarboxylic compound and a polyhydric alcohol having greater than about 4 weight percent halogen based on the weight of unsaturated polyester resin and a copolymerizable unsaturated monomer. The unsaturated polyester resins are copolymerized with an unsaturated monomer for use in castings, laminated products and other reinforced articles.

37 Claims, No Drawings

FIRE RETARDANT UNSATURATED POLYESTERS

CROSS REFERENCE TO RELATED APPLICATION

This is a continuation-in-part of applicants' copending U.S. application Ser. No. 383,749 filed July 30, 1973, now abandoned.

BACKGROUND OF THE INVENTION

Much effort has been expended in discovering and developing useful fire retardant polymer composition systems, and numerous examples of fire retardant polymers have appeared in the literature and some of them are in commercial use. But, the fire retardant requirements for polymeric materials have become evermore stringent as technology has become more sophisticated. Thus, whereas low burning rates were once the sole objective of research for fire retardant polymers, now low smoke generation and char formation characteristics are also significant.

Concurrently, there has been a desire on the part of plastics fabricators to retain the other beneficial qualities of the base polymer while enhancing the fire retardant properties. But heretofore, efforts to impart fire retardancy to polymer systems has resulted in diminishing the other useful properties. Thus, normally translucent polyester resins have been rendered opaque by the incorporation of sufficient quantities of antimony trioxide to render the polyester resins sufficiently fire retardant for certain uses.

Accordingly, it is an object of this invention to provide superior fire retardant unsaturated polyester resins that not only have low burning rates, but also exhibit low smoke generation when in contact with a flame.

It is also an object of the invention to provide superior fire retardant polyester resins that develop a beneficial, insulating layer of char in the presence of a flame which inhibits further combustion of the polymer.

It is still another object of the invention to render unsaturated polyester resins fire retardant without diminishing or deteriorating other useful properties of the polymer system.

These and other objects are accomplished by this invention which is described in detail hereinafter.

SUMMARY OF THE INVENTION

The superior fire retardant polymer compositions of the invention comprise an $\alpha,\beta$-ethylenically unsaturated polyester of a polycarboxylic compound and a polyhydric alcohol which contains a halogen in a proportion of greater than about 4 weight percent, and an effective fire retardant proportion up to about 5 weight percent of iron or an iron compound, wherein the foregoing proportions are based on the weight of the unsaturated polyester and a copolymerizable unsaturated monomer.

The preferred halogen containing polyesters of the invention are those wherein the halogen is provided by a Diels Alder adduct of a hexahalocyclopentadiene and a polycarboxylic compound or polyhydric alcohol containing aliphatic carbon-to-carbon unsaturation. The preferred adducts are chlorendic acid or chlorendic anhydride.

Various iron compounds can be employed in the compositions of the invention depending on the end results desired. Thus, where it is desired to retain the translucent character of the unsaturated polyester colorless iron salts can be employed, or iron salts that permit the transmission of light when incorporated in the polyester resin system can be used. The various iron oxides and other iron salts, including various organic iron compounds can be employed.

The unsaturated polyester resin containing the iron compound of the invention is copolymerized with an ethylenically unsaturated monomer, optionally in the presence of a reinforcing agent or filler, to provide the final polymerized product.

DESCRIPTION OF EMBODIMENTS

The Polyesters

The unsaturated polyesters useful in the invention are generally those commonly known in the art, and are generally the reaction product of a polycarboxylic compound and a polyhydric alcohol. By polycarboxylic compounds is meant the polycarboxylic acids, polycarboxylic anhydrides, polycarboxylic acid halides, and polycarboxylic acid esters. The unsaturation can be provided in either or both the polycarboxylic compound or the polyhydric alcohol. Suitable unsaturated polycarboxylic acids having aliphatic carbon-to-carbon double bonds, and the corresponding acid halides, esters, and anhydrides can include maleic, fumaric, chloromaleic, ethylmaleic, itaconic, citraconic, xeronic, pyrocinchonic, mesaconic, aconitic and acetylene dicarboxylic, either alone or in mixtures.

Illustrative of the unsaturated polyhydric alcohols having aliphatic carbon-to-carbon double bonds, which can be used in providing the unsaturation in the linear polyester molecules are compounds such as butene diol, pentene diol, the unsaturated hydroxy ethers such as allyl or vinyl glycerol ethers, allyl or vinyl pentaerythritol ethers and the like.

The saturated polycarboxylic compounds useful in the preparation of the polyesters can be aliphatic, cycloaliphatic, aromatic or heterocyclic. Illustrative of these polycarboxylic acids, acid halides, acid anhydrides and acid esters include phthalic, isophthalic, terephthalic, tetrachlorophthalic, tetrabromophthalic, dibromotetrahydrophthalic, chlorendic, adipic, succinic, dichlorosuccinic, and mixtures thereof.

Suitable saturated polyhydric alcohols for use in the preparation of the polyester resins include ethylene glycol, diethylene glycol, propylene glycol, dipropylene glycol, butane diol, pentane diol, hexane diol, dibromoneopentyl glycol, 1,4-cyclohexane dimethanol, glycerol, mannitol, sorbitol, bisphenols, substituted bisphenols, hydrogenated bisphenols and mixtures thereof.

The properties of the polyester resins can be modified by the incorporation of suitable monofunctional carboxylic compounds and alcohols. Illustrative examples of such compounds are 2,2-dichloroethanol; 1,1-dibromo-2-propanol; 2,2,2-tribromoethanol; 1,1,3,3-tetrabromo-2-propanol; 1,1,1-trifluoro-2-propanol and 2,3-dibromo-1-propanol. An example of a carboxylic compound is pentachlorophenoxy acetic acid.

The properties of the polyesters can be varied by using mixtures of the various types of acids and alcohols, such as an unsaturated acid, a saturated acid and a saturated alcohol.

The preferred unsaturated polyesters of the invention contain either an adduct of hexahalocyclopentadiene and a polycarboxylic compound containing aliphatic carbon-to-carbon unsaturation or an adduct of hexahalocyclopentadiene and a polyhydric alcohol containing aliphatic carbon-to-carbon unsaturation. The preferred unsaturated polyesters are the reaction products of a polycarboxylic adduct of hexahalocyclopentadiene, another carboxylic compound containing carbon-to-carbon unsaturation and a polyhydric alcohol. Such a product is disclosed and claimed in U.S. Pat. No. 2,779,701, issued Jan. 29, 1957. Other methods for incorporating either a polycarboxylic or polyhydric alcohol adduct of hexahalocyclopentadiene include: (1) the reaction of a polycarboxylic adduct of hexahalocyclopentadiene, an unsaturated polyhydric alcohol containing aliphatic carbon-to-carbon unsaturation, disclosed and claimed in U.S. Pat. No. 2,863,794, issued December 9, 1958; (2) the reaction of a polyhydric alcohol adduct of hexahalocyclopentadiene with a polycarboxylic compound containing aliphatic carbon-to-carbon unsaturation disclosed and claimed in U.S. Pat. No. 2,779,700, issued Jan. 29, 1957; and (3) the reaction of a polyhydric alcohol adduct of hexahalocyclopentadiene with another alcohol containing aliphatic carbon-to-carbon unsaturation and a polycarboxylic acid, disclosed and claimed in U.S. Pat. No. 2,863,795, issued Dec. 9, 1958. An alternate method for incorporating an adduct of hexahalocyclopentadiene into a polyester resin involves reacting an unsaturated polyester resin with a copolymerizable compound containing an adduct of hexahalocyclopentadiene, such as disclosed and claimed in U.S. Pat. No. 2,783,215, issued Feb. 26, 1957. The polyester resins containing the polycarboxylic and polyhydric alcohol adducts of hexahalocyclopentadiene can be modified by incorporating therein saturated carboxylic acids and anhydrides, as disclosed and claimed in U.S. Pat. No. 2,890,144, issued June 9, 1959, and U.S. Pat. No. 2,898,256, issued Aug. 4, 1959. When used in this specification, the term polycarboxylic compound refers to the polycarboxylic acids, acid anhydrides, acid halides and acid esters, of either the aliphatic or aromatic type.

Among the adducts of hexahalocyclopentadiene and polycarboxylic compounds which may be used are: 1,4,5,6,7,7-hexachlorobicyclo-(2.2.1)-5-heptene-2,3-dicarboxylic acid and anhydride, also known as chlorendic acid and anhydride; 1,4,5,6,7,7-hexabromobicyclo-(2.2.1)-5-heptene-2,3-dicarboxylic acid; 1,4,5,6,7,7-hexachloro-2-methylbicyclo-(2.2.1)-5-heptene-2,3-dicarboxylic anhydride; 1,4,5,6,7-tetrachloro-7,7-difluorobicyclo-(2.2.1)-5-heptene-2,3-dicarboxylic acid; 1,4,5,6,7,7-hexachlorobicyclo-(2.2.1)-5-heptene-2-acetic-2-carboxylic anhydride; 5,6,7,8,9,9-hexachloro-1,2,3,4,4a,8,8a-octahydro-5,8-methano-2,3-naphthalene dicarboxylic acid and anhydride; 1,2,3,4,5,6,7,7-octachloro-3,6-methano-1,2,3,6-tetrahydrophthalic acid and anhydride; 2,3-dicarboxy-5,8-endomethylene-5,6,7,8,9,9-hexachloro-1,2,3,4,4a,5,8-,8a-octahydronaphthalene anhydride; 2,3-bis(ethylene carboxy)-1,4,5,6,7,7-hexachlorobicyclo(2.2.1) 5-heptene; and 1,4,5,6,7,7-hexachlorobicyclo-(2.2.1)-5-heptene-2,3-dicarbonyl chloride.

Among the adducts of hexahalocyclopentadiene and polyhydric alcohols which may be used are: 1,4,5,6,7,7-hexachloro-2,3-bis-hydroxymethylbicylo-(2.2.1)-5-heptene; 1,4,,5,6,7,7-hexachloro-2,3-bis-hydroxymethylbicyclo-(2.2.1)-2,5-heptadiene; 3-(1,4,5,6,7,7-hexachlorobicyclo-(2.2.1)-5-heptene-2-yl)-methoxy-1,2-propanediol; 1,4,5,6-tetrachloro-7,7-difluoro-2,3-bis-hydroxymethylbicyclo-(2.2.1)-5-heptene; 1,4,5,6,7,7-hexabromo-2,3-bis-hydroxy-methyl-bicyclo-(2.2.1)-5-heptene; 3-(1,4,5,6-tetrachloro-7,7-difluorobicyclo-(2.2.1)-5-heptene-2-yl)-methoxy-1,2-propane diol. These compounds and methods of preparation are disclosed in U.S. Pat. No. 3,007,958, issued Nov. 7, 1961.

It is also within the scope of the invention to use other halogen-containing polyesters such as those derived from tetrachlorophthalic acid or anhydride, and tetrabromophthalic acid or anhydride.

Halogenated polyesters, especially brominated polyesters for use in the invention can be advantageously prepared by the procedure of Toggweiler et al. U.S. Pat. No. 3,536,782. In the latter process, base polyester is prepared by reaction of a polycarboxylic acid reactant comprising at least one alpha, beta ethylenically unsaturated dicarboxylic acid or anhydride containing up to 20 carbon atoms per molecule with at least one compound containing aliphatic unsaturation having a halogenation rate faster than that of the alpha, beta-ethylenically unsaturated dicarboxylic acid or anhydride e.g. polyhydric alcohol containing active unsaturation which is subject to subsequent halogenation or mixtures of at least one polyhydric alcohol with at least one ethylenically unsaturated dicarboxylic acid or anhydride free of alpha, beta ethylenic unsaturation other than aromatic unsaturation, and thereafter is halogenated by reaction with halogen sufficient to produce a halogenated polyester containing 10 to 60 weight percent halogen substituent employing a solvent, such as methylene dichloride, which is not readily susceptible to halogenation and a halogenation temperature of about −50° to +50° C. This technique and the halogenated products thereof (which conveniently may be termed post-halogenated polyesters) are described in greater detail in the aforementioned patent of Toggweiler et al., the pertinent disclosure of which is incorporated herein by reference.

The halogen can be provided in the polyesters of the invention by a combination of the foregoing methods. Thus, an unsaturated polyester can be prepared using a halogenated dibasic acid such as chlorendic acid, and a brominated alcohol such as dibromopropanol.

The polycarboxylic compounds and polyhydric alcohols required in the production of the foregoing halogen-containing adducts and polyesters can be provided by using any of the compounds disclosed hereinbefore.

The temperature for the reaction between polyhydric alcohols and polybasic acids ranges from about one hundred to two hundred degrees centigrade, although higher or lower temperatures can be used. Esterification catalysts such as para-toluene sulfonic acid, benzene sulfonic acid, beta-naphthalene sulfonic acid and the like, can be added to the reaction mixture. The proportion of polyhydric alcohol is approximately controlled by the total mole proportion of acids in the esterification reaction mixture. It is also preferred to react the polyhydric alcohols and polybasic acids in roughly equimolar proportion; however, either the acids or alcohols can be used in substantial excess, if it is desired to form a low molecular weight polyester resin.

Unsaturated Monomers

A variety of ethylenically unsaturated monomers can be used for curing or cross-linking the ethylenically unsaturated polyesters. It is generally preferred that addition polymerization be practiced since no by-product ammonia or water is formed, and the problems resulting therefrom are not experienced. The vinylidene monomers useful in curing the thermoplastic unsaturated polymers include vinylic compounds or mixtures thereof capable of cross-linking ethylenically unsaturated polymer chains at their points of unsaturation. Usually they contain the reactive groups $H_2C{=}C{<}$. Specific examples include styrene, vinyl toluene, vinyl acetate, chlorostyrenes, methyl styrenes such as alpha methyl styrene, p-methyl styrene, vinyl benzyl chloride, divinyl benzene, indene, unsaturated esters such as: methyl methacrylate, methyl acrylate and other lower aliphatic esters of acrylic and methacrylic acids, allyl esters such as allyl acetate, diallyl phthalate, diallyl succinate, diallyl adipate, diallyl sebacate, diethylene glycol bis(allyl carbonate), diallyl chlorendate, diallyl tetrachlorophthalate, and acrylate and methacrylate esters such as ethylene glycol diacrylate, ethylene glycol dimethacrylate, ethylene glycol diethacrylate, and mixtures thereof. The monomer may be admixed in the polymer in an amount sufficient to produce a thermoset polymer and the admixture heated to an elevated temperature in the presence of a suitable catalyst to cross-link or cure the polymer. With proper catalyst systems such as cobalt naphthenate and methylethyl ketone peroxide, room temperature cures are obtained.

The cross-linking agent can be advantageously combined with the polymerizable polyester while the unsaturated polyester and the olefinic cross-linking agent are at an elevated temperature thereby facilitating solution and mixing. To prevent premature polymerization at this stage, a polymerization inhibitor is advantageously added to the mixture, or preferably to one of its components prior to mixing, especially if the mixture is to be stored or shipped in commerce prior to curing. Alternatively, or in addition to including a polymerization inhibitor, a catalyst and/or promoter for the copolymerization may be added, particularly if it is desired to make available in commerce a composition which is ready for polymerization and does not require further chemical additions in order to be used, as is commonly known in the art.

The polymerization inhibitors generally are added in the order of 0.001 to 1 weight percent of the mixture. Among the inhibitors which may advantageously be employed to prevent the premature polymerization of the mixture of polymerizable polyester and olefinic cross-linking agents, particularly if the mixture is to be stored or shipped in commerce prior to curing, are substances such as hydroquinone, benzoquinone, paratertiarybutyl catechol, para-phenylene diamine, trinitrobenzene, picric acid, and the like.

The proportion of olefinic cross-linking agent to unsaturated polyester can be varied within the ultimate limits of each without departing from the scope of the invention, necessary to produce an infusible, insoluble, polyester resin. In general, the concentration of the unsaturated polyester in the olefinic cross-linking agent can vary between about ten and ninety percent. Polymerization catalysts are preferably added to the mixture of unsturated polyester and olefinic cross-linking agent to effect setting or curing. Catalysts such as benzoyl peroxide, acetyl peroxide, lauryl peroxide, methylethyl ketone peroxide, cumene hydroperoxide and the like are satisfactory. Such catalysts are used in proportions of 0.01 to 10 percent of the total resin, depending on the efficiency of their action and whether or not substances which inhibit polymerization are present in the mixture. The polymerization reaction can also be hastened by adding promoters such as metals or metal salts, cobalt resinates, cobalt maleate, cobalt naphthenate and the like, or amines such as dibutylamine, or mercaptans such as dodecyl mercaptan. These are used in proportions similar or smaller to that stated for the catalysts.

The Iron Compounds

In the preparation of translucent polyester laminates and other products of the invention, iron salts that permit the transmission of light when incorporated in the cured polyester are employed. Suitable iron salts are the colorless iron salts such as ferric sulfate hydrates. Other suitable salts which permit light transmission in the cured polyester include ferrous hydroxide, ferrous sulfate, ferrous tartrate, ferrous stannate, ferrous chloride, ferrous ammonium sulfate, and the like.

Other substantially insoluble iron compounds that can be used in accordance with the invention include ferric acetate, ferric formate, ferric borate, ferric tungstate, ferric vanadate, ferric molybdate, ferrous tungstate, ferric oxalate, ferric ferrocyanide, ferric chlorendate, and ferric hexachloronorbornene carboxylate.

Also useful in the compositions of the invention are the iron oxides, such as $Fe_2O_3$ (yellow and red iron oxide), $Fe_3O_4$ and FeO.

The iron compounds named hereinabove are substantially insoluble in the polyester when admixed with a copolymerizable unsaturated monomer. Also useful are iron compounds that are soluble in the admixture of polyester and copolymerizable unsaturated monomer, but which are free of iron-to-carbon bonds.

Useful soluble iron compounds include the metal or metalloxy beta-ketoenolates of the formula:

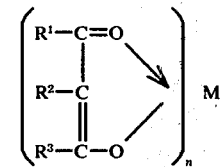

in which M is an iron ion, an ironoxy ion, or an iron hydroxy ion, in which n is an integer equal to the valence of the iron, ironoxy ion or iron hydroxy ion, in which each of $R^1$ and $R^3$ is a substituent selected from the group consisting of hydrogen and an organic substituent selected from alkyl, aryl, cycloalkyl, aralkyl, alkaryl, alkoxy, and aryloxy having one to eight carbon atoms and wherein each aryl substituent is carbocyclic, and in which $R^2$ is selected from the group consisting of $R^1$, $R^3$, halogen, nitro, and sulfo. Typical beta-ketoenolates are the ferrous or ferric acetylacetonates.

Other soluble iron compounds include the iron carboxylates, particularly derivatives of carboxylic acids for example of about 3 to 22 carbon atoms. Illustrative iron carboxylates are iron acrylate, iron oleate, iron naphthenate, iron stearate, iron laurate, iron linoleate, and the like.

Other iron compounds which have desirable fire retardant properties but which adversely affect the stability or the cure of the polymer compositions can be employed if such iron compounds are used in an inactive form such as encapsulated or reacted or complexed with another compound. Such iron compounds are ferric chloride and ferric oxychloride. These compounds can be encapsulated with gelatin or other polymeric materials. Alternatively, the compounds can be reacted or complexed with nitro compounds or aromatic ethers or amines. An example of a suitable compound is an amine salt of ferric chloride.

The metallic iron and insoluble iron compounds are incorporated into the polyesters in finely divided form. Preferred are particles passing through a 200 mesh standard sieve. Where translucent plastics are desired, the particulate iron additives should not contain a sufficient quantity of fine particles around the wave length of light, i.e., about 0.1 to 1 micron, to cause undesirable light scattering and resultant decrease in translucence. In practice, it has been observed that iron additives pulverized to pass completely through a 325 mesh screen contain sufficient fine particles to reduce translucency of the polyester.

The iron additives are generally incorporated in the compositions of the invention in a proportion up to about 5 weight percent of iron additive based on the weight of the unsaturated polyester and the copolymerizable unsaturated monomer, which corresponds to a proportion of up to about 50 weight percent of iron additive based on the weight of the unsaturated polyester. Preferably, the proportion of iron additive is in the range of about 0.5 to about 2 weight percent of iron additive based on the weight of unsaturated polyester resins and monomer, which corresponds to a range of about 0.55 to about 20 weight percent of iron additive based on the weight of unsaturated polyester.

The unsaturated polyester resins of the invention generally contain greater than about 4 weight percent up to about 40 weight percent of halogen based on the weight of the unsaturated polyester resin and the copolymerizable unsaturated monomer, which corresponds to greather than about 4.4 weight percent of halogen based on the weight of the unsaturated polyester resin. The proportion of halogen is preferably greater than 15 weight percent when the halogen is chlorine.

The compositions of the invention are phosphorus-free i.e., exclude phosphorus and compounds of phosphorus. Phosphorus tends to neutralize the synergistic effect of the iron on the halogen moiety. The compositions of the invention also exclude ferrocene and related compounds that have iron-to-carbon bonds. The compositions of the invention provide very effective fire retardance without the need for antimony trioxide which is so often used in commercial formulations to achieve low burning rates. The exclusion of antimony trioxide is especially preferred when it is desired to retain the translucent character of the polyester resins of the invention. The iron compounds and halogen component of the polyester can be the sole fire retardant agents present in the compositions of the invention.

The Curing Process

The polymerization conditions for effecting the cross-linking reaction between the unsaturated polyesters of this invention and the olefinic cross-linking agent may be selected from a wide variety of techniques but usually involve the application of heat or light. Although pressure is not a required condition for effecting polymerization of the polymerizable mixtures embraced within this invention, it is sometimes advantageously employed, particularly when it is desired to make laminates in preformed shape. The pressures found satisfactory for this purpose are relatively low compared to those required for molding or laminating other type resins than involved herein and may be of the order of that obtained by pressing glass plates having a fiber glass mat or laminate impregnated with the polyester resin sandwiched therebetween.

The temperature at which polymerization is effected depends on a variety of factors, particularly the boiling point of the olefinic cross-linking agent and the exothermic characteristics of the polymerization mixture. A temperature is selected which will give a suitable reaction rate and yet not cause substantial volatilization, and in the case of producing very thick castings, which will not produce a product which is crack-crazed.

The properties of the compositions of this invention can be varied substantially by incorporating modifying agents before, during or after any of the processing steps employed. For example, instead of producing articles of commerce from the compositions of this invention which are in the form of castings or laminates as previously described herein, a foamed type article may be made by incorporating a small percentage of a foaming agent such as sodium bicarbonate into the solution of unsaturated polyester dissolved in mono-olefin and thereafter effecting the copolymerization in the presence of catalyst and heat to produce the foamed article. Formulations which are useful for making molding embodying the compositions of this invention may be made by mixing into the unsaturated linear polyester and olefinic cross-linking agent mixture, an inert filler such as chopped fiber glass rovings, macerated fabric, asbestos fibers, mica, etc., which serve as fibrous reinforcing media and incorporating a small percentage of a mold lubricant, catalyst and/or promoter. Auxiliary fire retardant additives such as hydrated alumina can be used to add the fire retardance provided by the halogen and iron.

It is to be understood that dyes, pigments, plasticizers, lubricants and various other modifying agents are contemplated as being incorporated in certain formulations to produce compositions embraced in this invention in order to obtain or accentuate any given property.

The following examples are presented to illustrate this invention. It is to be understood that the examples are not to be construed as limiting the invention. In this specification and claims, all temperatures are in degrees centigrade and all parts are by weight, unless otherwise indicated.

Preparation of Polyesters

EXAMPLE 1 (Resin I)

An unpolymerized liquid unsaturated polyester resin was prepared by esterifying about 157 parts of ethylene glycol and 38 parts of diethylene glycol with about 668 parts of 1,4,5,6,7,7-hexachlorobicyclo-(2.2.1)-5-heptene-2,3-dicarboxylic acid and about 136 parts of fumaric acid. About 30 parts of styrene and about 70 parts of product produced by the esterification reaction were mixed together until complete solution was obtained to give a clear, substantially colorless solution of liquid polyester resin having a viscosity of about 30 poises at 25° centigrade on a Gardner bubble viscometer and having a chlorine content of about 30 percent by weight of the total.

EXAMPLE 2 (Resin II)

An unpolymerized liquid unsaturated polyester resin was prepared by esterifying about 76 parts of propylene glycol with about 128 parts of 1,4,5,6,7,7-hexachlorobicyclo(2.2.1)-5-heptene-2,3-dicarboxylic acid and about 76 parts of fumaric acid. About 28 parts of styrene and about 55 parts of product produced by the esterification reaction were mixed together until complete solution was obtained to give a clear, substantially colorless solution of liquid polyester resin having a chlorine content of about 19 percent by weight of the total.

EXAMPLE 3 (Resin III)

An unpolymerized liquid unsaturated polyester resin was prepared by esterifying about 397 parts of ethylene glycol with about 232 parts of fumaric acid and about 1,258 parts of tetrachlorophthalic anhydride to provide a polyester of acid number 28 mg KOH/gram. About 720 parts of styrene were mixed with 1,674 parts of the esterification product until complete solution was obtained to give a clear substantially colorless solution of liquid polyester having a chlorine content of about 26 percent.

EXAMPLE 4 (Resin IV)

An unpolymerized liquid unsaturated polyester resin was prepared by esterifying about 19 parts of diethylene glycol and about 140 parts of ethylene glycol with 118 parts of maleic anhydride, 57 parts of phthalic anhydride, 375 parts of tetrabromophthalic anhydride and 3 parts of sodium acetate. About 271 parts of styrnee and 0.1 part of hydroquinone were mixed with polyester until complete solution was obtained to give a clear, substantially colorless solution of liquid polyester having a viscosity of about 4 poises at 25° centigrade on a Gardner bubble viscometer and having a bromine content of about 26 percent.

EXAMPLE 5 (Resin V)

A mixture of 194.5 parts (0.5 mole) of chlorendic acid, 98.1 parts (1.0 mole) of maleic anhydride, 217.9 parts (1.0 mole) of 1,2-dibromopropanol and 24.8 parts (0.40 mole) of ethylene glycol and 36.8 parts (0.40 mole) glycerol were heated, under a steady nitrogen sparge, to and maintained at about 165°, while collecting the water formed as a distillate. After about 12 hours, the acid number of the reaction mixture had decreased to 46. A small quantity, about 0.10 part, of tolylhydroquinone was added to the mixture and the reaction was continued for an additional four hours at which time the acid number was about 34. The resultant polyester product was analyzed and found to contain 26.0 percent bromine, 20.0 percent chlorine and the average molecular weight of the polymer chains was 1,150. An amount of styrene equivalent to about one-third the weight of the polyester mass was added to the hot mass and the resultant solution was cooled to ambient temperature. The viscosity (Brookfield) of the solution was 1620 cps at 25°.

EXAMPLES 6 to 10

Tables I through V below show the results of fire retardance tests by the ASTM D-757-65 test method on castings of the resin prepared as described in Examples 1 to 5, (Resins I to V, respectively). The castings were prepared by mixing 100 parts by weight of resin with iron compound in the amount indicated in the tables, 0.2 part of 12 percent cobalt octoate, and such other additives as are indicated in the tables. After at least 10 minutes' stirring to assure uniform dispersion of the immiscible material the catalyst, methyl ethyl ketone peroxide (60% in dimethyl phthalate), 1 part was added, stirred for 1 to 2 minutes, and then the mixture was allowed to cure at 25° C for 16 hours and at 65° centigrade for 8 hours. The castings were then removed from the mold, cut into specimen bars for testing by ASTM D-757-65 test method, for smoke by ASTM D-283-70, and for heat deflection temperature (identified in the tables as "HDT"), by ASTM D-648-72 test method. Data on light absorption due to smoke obscuration was acquired by a computer which printed out the light absorption and percent smoke at one second intervals. The "Smoke Density Rating" of this modification of the ASTM test is the percent smoke at 60 seconds. Samples which were used for the ASTM D-648-73 test measured 0.5 inch × 0.5 inch × 0.125 inch.

TABLE I

Fire Retardant Synergism of Iron Compounds with Resin I

| Casting No. | Compound | Weight Percent | HDT | ASTM D-757-65 Burn Rate (in/min) | Flameout Time (secs) | Smoke Density Rating, % | Char, % |
|---|---|---|---|---|---|---|---|
| A | none | | 115 | 0.20 | 160 | 60 | 18 |
| B | Antimony oxide | 5 | 82 | 0.08 | 120 | 48 | 33 |
| C | Antimony oxide | 1 | 86 | 0.09 | 140 | 52 | 31 |
| D | Iron oxide, yellow | 1 | 79 | 0.04 | 0 | 37 | 43 |
| E | Iron oxide, yellow | 5 | 85 | 0.05 | 0 | | |
| F | Iron oxide, yellow | 10 | 76 | 0.05 | 0 | | |
| G | Iron oxide, red | 0.5 | 100 | 0.13 | 105 | | |
| H | Iron oxide, red | 0.75 | 102 | 0.11 | 90 | | |
| I | Iron oxide, red | 1 | 94 | 0.08 | 70 | | |
| J | Iron oxide, red | 1.25 | 101 | 0.09 | 80 | | |
| K | Iron oxide, red | 1.5 | 102 | 0.09 | 87 | | |
| L | Iron oxide, red | 5 | 86 | 0.09 | 40 | | |
| M | Iron oxide, red | 10 | 86 | 0.08 | 25 | | |
| N | Iron oxide, black | 0.75 | 81 | 0.06 | 62 | | |
| O | Iron oxide, black | 1 | 81 | 0.06 | 0 | 32 | 47 |
| P | Iron oxide, black | 1.25 | 83 | 0.05 | 27 | | |
| Q | Iron oxide, black | 2.0 | 83 | 0.06 | 0 | | |
| R | Iron oxide, black | 3 | 83 | 0.06 | 0 | | |
| S | Ferric acetate | 1 | 106 | 0.08 | 122 | | |
| T | Ferric formate | 1 | 107 | 0.09 | 145 | | |
| U | Ferrous tartrate | 1.5 | 106 | 0.12 | 165 | | |
| V | Ferric sulfate | 1 | 81 | 0.09 | 125 | | |
| W | Ferric tungstate | 3 | 81 | 0.07 | 165 | | |
| X | Ferric tungstate | 4 | 82 | 0.06 | 0 | | |

TABLE I-continued

Fire Retardant Synergism of Iron Compounds with Resin I

| Casting No. | Compound | Weight Percent | HDT | ASTM D-757-65 Burn Rate (in/min) | Flameout Time (secs) | Smoke Density Rating, % | Char, % |
|---|---|---|---|---|---|---|---|
| Y | Ferric ferrocyanide | 0.5 | 79 | 0.13 | 180 | | |
| Z | Ferric ferrocyanide | 2 | 80 | 0.10 | 140 | | |
| AA | Ferric sulfate | 0.5 | 83 | 0.11 | 165 | | |
| AB | Ferric sulfate | 1.5 | 86 | 0.08 | 130 | | |
| AC | Ferric molybdate | 3 | 82 | 0.08 | 102 | | |
| AD | Ferric borate | 2 | 82 | 0.11 | 115 | | |
| AE | Ferrous stannate | 1 | 84 | 0.07 | 35 | | |
| AF | Ferrous stannate | 2 | 84 | 0.08 | 0 | 40 | |
| AG | Ferrous stannate | 4 | 82 | 0.06 | 0 | 38 | |
| AH | Ferrous tungstate | 1 | 82 | 0.16 | 130 | | |
| AI | Ferrous chloride | 1 | 78 | 0.11 | 130 | | |
| AJ | Ferrous sulfate | 1 | 83 | 0.10 | 145 | | |
| AK | Ferrous ammonium sulfate | 1 | 83 | 0.12 | 145 | | |
| AL | Ferric chlorendate | 2 | 116 | 0.12 | 70 | | |
| AM | Ferric hexachloronor-bornene carboxylate | 5 | 96 | 0.11 | 100 | | |
| AN | Ferric acrylate | 1 | 82 | 0.18 | 100 | 46 | |
| AO | Ferric acrylate | 2 | 82 | 0.12 | 115 | 45 | |
| AP | Ferric acetylacetonate | 1 | 105 | 0.10 | | | |

TABLE II

Fire Retardant Synergism of Iron Compounds with Resin II

| Casting No. | Compound | Weight Percent | HDT | ASTM D-757-65 Burn Rate (in/min) | Flameout Time(secs) | Smoke Density Rating, % | Char, % |
|---|---|---|---|---|---|---|---|
| BA | none | | 91 | 0.43 | 180 | 44 | 19 |
| BB | Antimony oxide | 1 | 93 | 0.17 | 170 | 44 | 27 |
| BC | Antimony oxide | 2 | 94 | 0.16 | 165 | 45 | 28 |
| BD | Antimony oxide | 3 | 94 | 0.10 | 180 | 39 | 27 |
| BE | Iron oxide, red | 1 | 141 | 0.14 | 140 | 26 | 26 |

TABLE III

Fire Retardant Synergism of Iron Compounds with Resin III

| Casting No. | Compound | Weight Percent | HDT | ASTM D-757-65 Burn Rate (in/min) | Flameout Time(secs) | Smoke Density Rating, % |
|---|---|---|---|---|---|---|
| CA | none | | 78 | 0.55 | 180 | 76 |
| CB | Antimony oxide | 1 | 76 | 0.20 | 145 | 75 |
| CC | Antimony oxide | 2 | 77 | 0.17 | 135 | 77 |
| CD | Antimony oxide | 3 | 76 | 0.17 | 155 | 75 |
| CE | Iron oxide, yellow | 1 | 76 | 0.40 | 153 | 69 |
| CF | Ferric sulfate | 1 | 76 | 0.39 | 180 | 71 |
| CG | Iron oxide, black | 1 | 76 | 0.34 | 167 | 76 |

TABLE IV

Fire Retardant Synergism of Iron Compounds with Resin IV

| Casting No. | Compound | Weight Percent | HDT | ASTM D-757-65 Burn Rate (in/min) | Flameout Time(secs) | Smoke Density Rating, % |
|---|---|---|---|---|---|---|
| DA | none | | 74 | 0.17 | 0 | 70 |
| DB | Ferric sulfate | 1 | 74 | 0.13 | 0 | 63 |
| DC | Antimony oxide | 1 | 75 | 0.16 | 0 | 66 |
| DD* | none | | 83 | 0.29 | 157 | 71 |
| DE* | Iron oxide, red | 0.5 | 81 | 0.17 | 0 | 74 |

*Castings DD and DE were run with different sample of Resin IV than Castings DA, DB, DC.

TABLE V

Fire Retardant Synergism of Iron Compounds with Resin V

| Casting No. | Compound | Weight Percent | HDT | ASTM D-757-65 Burn Rate (in/min) | Flameout Time(secs) | Smoke Density Rating, % |
|---|---|---|---|---|---|---|
| EA | none | | 86 | 0.10 | 0 | 52 |
| EB | Iron oxide, yellow | 1 | 90 | 0.13 | 0 | 53 |
| EC | Iron oxide, yellow | 2 | 92 | 0.13 | 0 | 48 |
| ED | Iron oxide, yellow | 3 | 84 | 0.13 | 0 | 49 |
| EE | Antimony oxide | 1 | 85 | 0.07 | 0 | 54 |
| EF | Antimony oxide | 2 | 87 | 0.08 | 0 | 52 |

TABLE V-continued

Fire Retardant Synergism of Iron Compounds with Resin V

| Casting No. | Compound | Weight Percent | HDT | ASTM D-757-65 Burn Rate (in/min) | Flameout Time(secs) | Smoke Density Rating, % |
|---|---|---|---|---|---|---|
| EG | Antimony oxide | 3 | 85 | 0.07 | 0 | 53 |

In the testing of synergism with Resin V, it was seen in Table V that the D-757 test was insufficient in differentiating synergistic effects of iron and antimony compounds. The samples that contained levels of 1 percent or more of fire retardant additives did not ignite, so the "burning rate" which was variable and poorly reproducible, was really a "charring rate". It is often preferable in fire retardant plastics to obtain a rapid charring material (that can insulate against the heat source) rather than a slow-charring material. (See for instance, "Flammability of Plastic III," Learmonth and Thwaite, British Polymer Journal, 2, 104, (1970).

Resin V materials were therefore evaluated by another method than the ASTM D-757 Test. Samples of material were heated at 10 degrees centigrade per minute while the weight loss of the samples was observed continuously by the thermogravimetric analysis technique. Results are shown in Table VI. At low rates of heating to 600° C, it was observed that there was little change in weight loss after the samples had reached 400° C. It was observed that Resin V lost weight more rapidly than Resin I which is consistant with the lower Time to Flameout of Resin V. With 1 percent iron oxide added to Resin V, it was observed that weight loss occurred much more rapidly and that a 30 percent weight loss had already occurred at 264° as compared to a comparable weight loss at 308 degrees for Resin V without additive or with antimony oxide. The addition of iron oxide also catalyzed the formation of a large char residue (47%) which made less material available for gaseous fuel and less material available for smoke formation. From these data it is concluded that under flaming conditions where Resin V is exposed to conditions of extremely rapid temperature rise, neither the addition of iron compounds nor antimony compounds will improve the fire retardant and low smoke properties much; but in oven-like conditions where the temperature rise to the flaming condition is slower, the Resin V compositions that contain a synergistic amount of iron compound will give improved fire retardance and low smoke properties.

TABLE VI

Synergism in Weight Loss on Heating (10°/min) of Resins I and V

| Resin | Additive | Weight Percent | Char Residue % 400° C | Temperature, ° C 30% Weight Loss |
|---|---|---|---|---|
| V | None | — | 18 | 308 |
| V | Iron oxide | 1 | 47 | 264 |
| V | Antimony oxide | 5 | 16 | 313 |
| I | None | — | 36 | 327 |

EXAMPLE 11 — Resin-Soluble Iron Compounds as FR Synergists

Compounds of iron that are soluble in styrenated resin composition, such as Resins I–V, are also effective fire retardant synergistic components with halogens. Examples of such a soluble compound, ferric acrylate, are shown in Table I, Casting Nos. AN and AO.

Soluble iron compounds in the resin can cause effects on the peroxide-initiated cure of the resin to a greater degree than the insoluble compounds. Ferric acetylacetonate, for instance, accelerates the methyl ethyl ketone peroxide initiated cure of Resin I so that no cobalt octoate is required to obtain a room temperature cure. Polymerization inhibitors may be added, such as chloranil and t-butyl catechol, to obtain sufficiently long pot life.

Resin I, 130 parts; dibromopropyl hydroxyethyl fumarate, 7 parts; styrene, 6 parts; chloranil, 0.02 parts; t-butyl catechol, 0.01 parts; and methyl ethyl ketone peroxide, 1 part were blended to provide a polymerizable mixture which had a gel time at 25° C of 30 minutes. The composition was tested as in the preceding Examples 6 to 10 and found to give the results shown in Table VII.

TABLE VII

Fire Retardant Synergism of Iron Acetylacetonate in Resin I

| Casting No. | Compound | Weight Percent | HDT ° C | ASTM D-757-65 Burn Rate (in/min) | Flameout Time(secs) |
|---|---|---|---|---|---|
| GA | None |  | 98 | 0.17 | 180 |
| GB | Iron Acetylacetonate | 1.5 | 70 | 0.07 | 0 |

EXAMPLE 12 — Iron-Phosphorus Interaction in FR Polyesters

It has been observed that iron compounds are antagonistic with compounds of phosphorus, such as triethyl phosphate, in the fire retardant resins of our invention. Iron compounds of phosphorus are also inactive as shown in Table VIII. Testing was conducted in accordance with the procedure of Examples 6–10.

TABLE VIII

Inactive Iron-Phosphorus Compounds in Resin I

| Casting No. | Compound | Weight Percent | HDT ° C | ASTM D-757-65 Burn Rate (in/min) | Flameout Time(secs) |
|---|---|---|---|---|---|
| HA | None |  | 115 | 0.20 | 160 |
| HB | Ferric Glycerophosphate | 1 | 114 | 0.21 | 155 |

TABLE VIII-continued

Inactive Iron-Phosphorus Compounds in Resin I
ASTM D-757-65

| Casting No. | Compound | Weight Percent | HDT °C | Burn Rate (in/min) | Flameout Time(secs) |
|---|---|---|---|---|---|
| HC | Ferrous phosphate | 1 | 113 | 0.20 | 107 |
| HD | Ferrous phosphate | 2 | 111 | 0.21 | 180 |
| HE | Ferrous phosphate | 4 | 112 | 0.19 | 160 |
| HF | Ferric phosphate | 2 | 84 | 0.20 | 147 |
| HG | Ferric acetylacetonate and Triethyl phosphate | 1.75 / 5 | 62 | 0.25 | 170 |

EXAMPLE 13 — (Resin VI)

A post-brominated polyester was prepared in substantial accord with the procedure of U.S. Pat. No. 3,526,782 by esterifying about 361.6 parts of ethylene glycol with 424.5 parts of tetrahydrophthalic anhydride and 237.58 parts of maleic anhydride in the presence of 0.053 parts of tolylhydroquinone polymerization inhibitor under an inert atmosphere of nitrogen gas, recovering the resultant polyester and subjecting 458.75 parts of the polyester product to halogenation with 208.75 parts of molecular bromine in the presence of 668 parts methylene chloride reaction solvent to obtain a posthalogenated polyester which was the brominated product of the ester of ethylene glycol with tetrahydrophthalic anhydride and maleic anhydride. The post-brominated polyester was then mixed with styrene substantially in accordance with the procedure of Example 1 to provide a polyester-styrene mixture containing about 70% post-brominated polyester and 30% styrene.

EXAMPLE 14

Castings of Resin VI were prepared by a procedure substantially in accord with the method employed in Examples 6 to 10 above (employing about 130 parts of the styrene-post-brominated polyester mixture of Example 13 for each casting) except that 0.8 parts by volume of the solution of methyl ethyl ketone peroxide in dimethyl phthalate together with 0.18 parts by volume of liquid cobalt octoate (Cobalt Ten Chem manufactured by Mooney Chemicals Inc. containing 12% cobalt octoate) were used in preparing each casting, casting IB having 2 weight percent yellow iron oxide as fire retardant, casting IC being a comparative casting having 2 parts of antiomny trioxide as fire retardant, and casting IA being a control without an inorganic fire retardant additive. The castings were cut into specimen bars and tested for heat distortion temperature properties by the ASTM D-648-72 testing method, for burn rate and flame out time by the ASTM D-757-65 test method and for smoke density by the ASTM D-2843-70 Test method substantially as described in the procedure given for Examples 6 to 10 above. The results of these tests are set forth in Table IX below. The excellent low flame out time and smoke density and satisfactory burn rate of the yellow iron oxide-containing casting compared to the corresponding properties of the control casting and the antimony trioxide-containing casting indicate the efficiency of the iron additive as fire retardant in the styrene-post-brominated polyester resin

TABLE IX

Fire Retardant Synergism of Iron Compound with Resin VI
ASTM D-757-65

| Casting No. | Compound | Weight Percent | HDT | Burn Rate (in/min) | Flameout Time(secs) | Smoke Density Rating, % |
|---|---|---|---|---|---|---|
| IA | none | — | 78 | 0.438 | 180 | 81.8 |
| IB | iron oxide, yellow | 2 | 77 | 0.271 | 146.5 | 80.7 |
| IC | antimony oxide | 2 | 76.5 | 0.208 | 148.5 | 81.1 |

The foregoing specification is intended to illustrate the invention with certain preferred embodiments, but it is understood that the details disclosed herein can be modified without departing from the spirit and scope of the invention.

We claim:

1. An unsaturated polyester composition which is copolymerizable with a copolymerizable unsaturated monomer to form a fire retardant polymer composition, said unsaturated polyester composition comprising an $\alpha,\beta$-ethylenically unsaturated polyester of a polycarboxylic compound and a polyhydric alcohol, which contains halogen in a proportion of greater than about 4.4 weight percent, and about 0.55 to about 50 weight percent of iron compound that is insoluble in said polyester when admixed with a copolymerizable unsaturated monomer, or an iron compound that is soluble in said polyester and monomer but which is free of iron-to-carbon bonds, wherein said composition is substantially phosphorus-free, wherein the proportions are based on the weight of unsaturated polyester.

2. A copolymerizable mixture of an unsaturated polyester composition and a copolymerizable ethylenically unsaturated monomer capable of copolymerization to form a fire retardant polymer composition, said unsaturated polyester composition comprising an $\alpha,\beta$-ethylenically unsaturated polyester of a polycarboxylic compound and a polyhydric alcohol, which contains halogen in a proportion of greater than about 4 weight percent, and an effective fire retardant proportion of about 0.5 up to about 5 weight percent of iron compound that is insoluble in said polyester when admixed with a copolymerizable unsaturated monomer, or an iron compound that is soluble in said polyester and monomer but which is free of iron-to-carbon bonds, wherein said composition is substantially phosphorus-free, wherein said proportions are based on the weight of unsaturated polyester and copolymerizable unsaturated monomer.

3. The composition of claim 2 wherein said halogen is present as a halogen containing polycarboxylic compound.

4. The composition of claim 3 wherein said halogen is chlorine.

5. The composition of claim 3 wherein said polycarboxylic compound is chlorendic acid or chlorendic anhydride.

6. The composition of claim 3 wherein said polycarboxylic compound is tetrachlorophthalic anhydride.

7. The composition of claim 2 wherein the halogen is bromine.

8. The composition of claim 3 wherein said polycarboxylic compound is tetrabromophthalic anhydride.

9. The composition of claim 2 wherein said halogen is chlorine and bromine.

10. The composition of claim 9 wherein said halogen is present as chlorendic acid or anhydride and dibromopropanol.

11. The composition of claim 2 wherein said iron compound is an essentially colorless iron salt.

12. The composition of claim 11 wherein the iron salt is ferric sulfate.

13. The composition of claim 2 wherein said iron compound is an iron salt that permits transmission of light when said polyester is copolymerized with an unsaturated monomer.

14. The composition of claim 13 wherein said iron salt is ferrous sulfate.

15. The composition of claim 13 wherein said iron salt is ferric acrylate.

16. The composition of claim 2 wherein said iron compound is an iron oxide.

17. The composition of claim 16 wherein said iron oxide is yellow iron oxide $Fe_2O_3$.

18. The composition of claim 2 wherein said iron compound is an insoluble compound.

19. The composition of claim 18 wherein said iron compound is ferric acetate.

20. The composition of claim 18 wherein said iron compound is ferrous tartrate.

21. The composition of claim 18 wherein said iron compound is ferric tungstate.

22. The composition of claim 18 wherein said iron compound is ferric borate.

23. The composition of claim 18 wherein said iron compound is ferric molybdate.

24. The composition of claim 2 wherein said iron compound is a soluble iron compound that is free of iron-to-carbon bonds.

25. The composition of claim 24 wherein said iron compound is ferric acetylacetonate.

26. The mixture of claim 2 wherein said monomer is styrene.

27. The mixture of claim 2 when copolymerized to an infusible product.

28. The composition of claim 2 when mixed with an inert filler and copolymerized to an infusible, insoluble product.

29. The composition of claim 2 when mixed with a reinforcing agent and copolymerized to an infusible, insoluble reinforced product.

30. A laminated article comprised of copolymerized sheets of the composition of claim 2 admixed with a reinforcing agent.

31. A copolymerizable mixture of an unsaturated polyester composition and a copolymerizable ethylenically unsaturated monomer capable of copolymerization to form a translucent fire retardant polymer composition, said unsaturated polyester composition comprising an unsaturated polyester of chlorendic acid or anhydride, an unsaturated dicarboxylic acid or anhydride and a dihydric alcohol, which contains halogen in a proportion of greater than about 20 weight percent and a proportion of about 0.5 to about 2 weight percent of an iron compound that is insoluble in said polyester when admixed with a copolymerizable ethylenically unsaturated monomer and permits transmission of light when said polyester is copolymerized with said monomer, wherein said proportions are based on the weight of said unsaturated polyester and said monomer.

32. The composition of claim 31 wherein the iron compound is ferric sulfate.

33. The composition of claim 7 wherein the polyester is a post-brominated polyester.

34. The composition of claim 33 wherein the post-brominated polyester is the brominated product of the ester of ethylene glycol with tetrahydrophthalic anhydride and maleic anhydride.

35. The composition of claim 26 wherein the halogen is bromine.

36. The composition of claim 35 wherein the polyester is a post-brominated polyester.

37. The composition of claim 36 wherein the post-brominated polyester is the brominated product of the ester of ethylene glycol with tetrahydrophthalic anhydride and maleic anhydride.

* * * * *